United States Patent [19]
Jenkin

[11] 3,952,151
[45] Apr. 20, 1976

[54] METHOD AND APPARATUS FOR STABILIZED REPRODUCTION OF REMOTELY-SENSED IMAGES

[75] Inventor: Keith R. Jenkin, Manhattan Beach, Calif.

[73] Assignee: TRW Inc., Redondo Beach, Calif.

[22] Filed: Aug. 13, 1973

[21] Appl. No.: 388,001

[52] U.S. Cl. .............................. 178/6.8; 178/6.7 R; 355/52
[51] Int. Cl.$^2$ .................. G03B 27/68; H04N 1/24; H04N 1/28
[58] Field of Search ............. 178/6.8, 6.7 R; 33/1 A; 355/20, 52; 353/3, 69, 70; 352/105

[56] References Cited
UNITED STATES PATENTS

| | | | |
|---|---|---|---|
| 2,839,974 | 6/1958 | Reiner | 355/52 |
| 2,967,211 | 1/1961 | Blackstone | 178/6.8 |
| 3,026,765 | 3/1962 | Guarricini | 33/1 A |
| 3,054,854 | 9/1962 | Neasham | 178/6.7 R |
| 3,294,903 | 12/1966 | Goldmark | 178/6.8 |
| 3,314,075 | 4/1967 | Becker | 352/105 |
| 3,446,553 | 5/1969 | Somazzi | 355/52 |
| 3,576,368 | 4/1971 | Goetz | 352/105 |

*Primary Examiner*—Howard W. Britton
*Attorney, Agent, or Firm*—Daniel T. Anderson; Stephen J. Koundakjian

[57] ABSTRACT

Disclosed is a method and apparatus for reproducing remotely sensed images in which the effect of attitude perturbation in the sensing device is removed from the image.

The image is acquired by means of an electromagnetic radiation sensor mounted on a non-stationary body, such as an earth satellite, a helicopter, or the shoulder of a cameraman. An electronic signal representative of the three-axis attitude perturbation of the sensor is generated simultaneously with the data signal from sensor and a signal representative of the instantaneous nominal attitude thereof. These signals are transmitted (in some cases with the intermediate step of tape recording) to an image reproduction device such as a cathode ray tube or a portion of photographic film exposed by a narrow-beam light source. The data signal activates the image generator (i.e., the electron beam or the exposing light source); the signal corresponding to the nominal sensor attitude scans the image generator (e.g., by plate or coil deflection in the cathode ray tube or by beam deflection in the photographic image reproduction system); and the three-axis attitude perturbation signals perturb the image generator motion in the same manner as the sensor itself is perturbed while sensing the original image.

30 Claims, 6 Drawing Figures

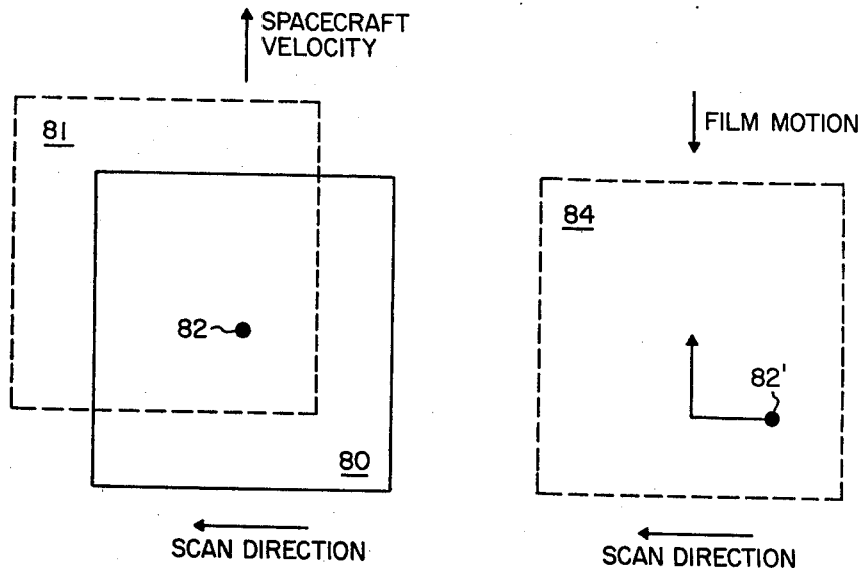
Fig. 4A
Fig. 4B
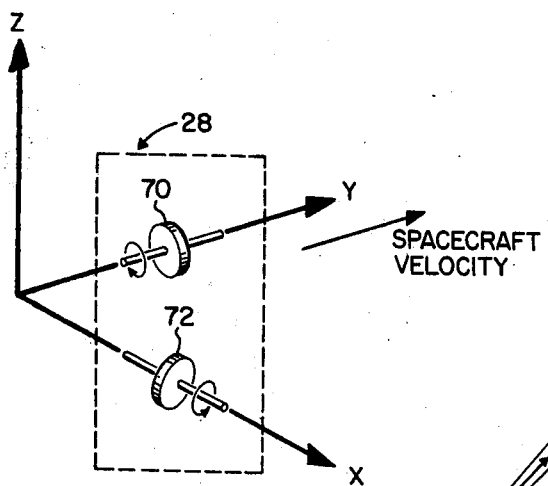
Fig. 3
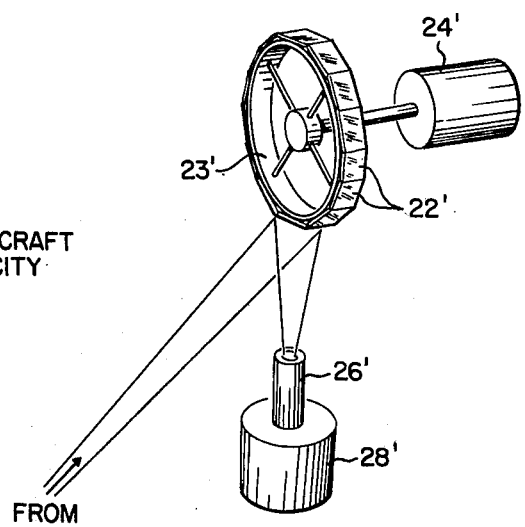
Fig. 5

METHOD AND APPARATUS FOR STABILIZED REPRODUCTION OF REMOTELY-SENSED IMAGES

BACKGROUND OF INVENTION

1. Field of Invention

This invention relates to the field of image stabilization in the reproduction of remotely-sensed images.

2. Description of Prior Art

Image stabilization is an important problem in many image acquisition situations. For example, without image stabilization, the picture transmitted by a TV cameraman having a remote unit mounted on his shoulder will wobble when reproduced if, when the original image was acquired, the cameraman was jostled about by a crowd during a riot or if he was using a telephone lens. Likewise, live TV or video tape images produced by a helicopter or airplane-mounted TV camera require similar stabilization. Similarly, an earth or astronomical image acquired by a remote sensor mounted in an orbiting earth satellite becomes unstable if, during image acquisition, the satellite is, for some reason, perturbed from its instantaneous nominal attitude.

In the satellite case (for example, in the production of accurately detailed earth-resources maps), a method does exist for image stabilization. Transmitted to the ground station along with the data acquired from the satellite sensor are signals generated by an inertial platform or similar device which senses attitude perturbations from the norm. In this state-of-the-art method the perturbation data is digitized and, by means of a computer, this digital data is caused to adjust the data from the satellite (also digitized), representing the instantaneous nominal scan direction.

Because of the high image resolution and resultant large-volume data acquisition and transmission currently realizable in modern satellite-borne detector systems, and the rather complex matrix multiplication computer manipulations required to make the necessary adjustment in data values, this state-of-the-art method is marginally practical at best and impossible to implement in real time.

Obviously such a method is totally impractical in the case of ordinary live TV or video tape surveillance of a scene by a cameraman on the ground or in a helicopter.

SUMMARY OF THE INVENTION

Accordingly, it is an object of this invention to provide a method and apparatus for stabilization of reproduced images acquired from remote sensors which is simpler and, consequently, more practical than those heretofore employed.

It is a further object of this invention to provide such a method and apparatus which can be implemented in real time.

Briefly, in the method of the present invention, electronic signals are generated in correspondence to the instantaneous three-axis attitude perturbation of the sensing device. At the image reproduction station, the reproduction image generator (e.g., an electron beam or a light source directed at a photographic film or plate) is differentially deflected along the same three axes, in response to these generated signals. Thus, the image reproduction device is perturbed in the same fashion as the image acquisition device.

In the apparatus of the present invention, image acquisition is accomplished by an electromagnetic radiation sensor, such as a TV camera, video tape camera or electromagnetic detector operating in a suitable band width, such as visible, infrared, microwave, etc. The instantaneous attitude perturbations of the satellite are sensed by appropriate means, such as an inertial platform which generates a signal (or signals) corresponding to the instantaneous deviation of the spacecraft attitude from the norm along the three mutually-orthogonal axis. The sensor data, the attitude data, and (where necessary) the synchronization data (extracted from the scanning device) are simultaneously transmitted or, in case of a videotape recorder, simultaneously tape recorded.

The sensed image is reproduced (if desired, in real time) by reconstructing the sensor data together with the synchronization data by suitable means, such as activation of an electron gun and deflector plates or coils in a cathode ray tube, or by activation of a laser beam directed toward a photographic film through an optical arrangement, which reproduces the scanning apparatus which coordinated with the sensor as it acquired the original image.

The reproduction image generating device (i.e., the electron beam or the laser beam) is also differentially deflected by a signal corresponding to the attitude error signals. This is accomplished, in the cathode ray tube case, by activation of the deflector plates or coils, i.e., by summing the error signal with the ordinary sweep signal. In the light beam case, this deflection may be accomplished by perturbing the orderly operation of the scan reproduction optics.

DESCRIPTION OF THE DRAWING

FIG. 3 is a diagramatic representation of a pair of mutually orthogonal gyroscopes comprising a type of inertial platform.

FIG. 4A is a diagramatic representation of an image acquired by an attitude-perturbed sensor.

FIG. 4B is a diagramatic representation of the reproduction of the image in FIG. 4A, eliminating the effect of the attitude perturbation.

FIG. 5 is a schematic representation of a linescan image acquisition device.

DETAILED DESCRIPTION OF PREFERRED EMBODIMENT

The basic function of the method and apparatus of the present invention is to stabilize, upon reproduction, an image acquired at a remote source which, during acquisition, has undergone attitude perturbations. Since the essence of the method and apparatus is the same, regardless of a particular embodiment, heavy emphasis will be placed, in the discussion below, on the preferred embodiment, with reference, from time to time, to other embodiments.

Figure 1:
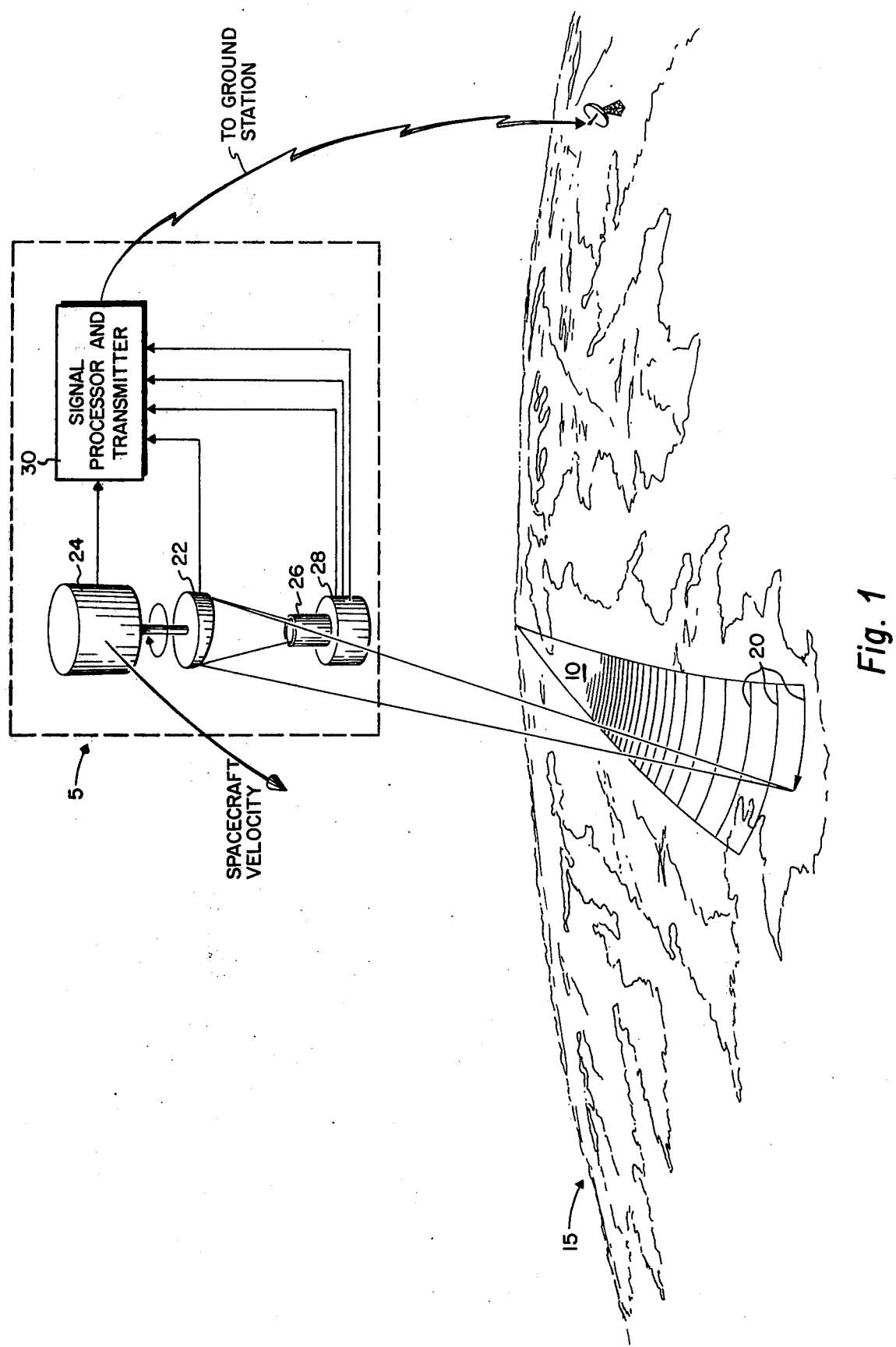
FIG. 1 is a schematic representation of a satellite-borne detector conically scanning the earth's surface, showing the acquisition and transmission of sensor data, according to an embodiment of the present invention.

Accordingly, in the preferred embodiment of the present invention, the original image is acquired by a sensor 26 of electromagnetic radiation mounted within a spacecraft 5, moving above the earth 15, having its velociity vector oriented as shown in FIG. 1. The sensor may be adapted to detect radiation within any desirable range, for example, microwave, near or far infrared, visible or ultraviolet, depending on the particular application to which this invention is put.

In the preferred embodiment, a conical scan of the earth's surface is performed. This is accomplished by mounting a rotating mirror 22 having its reflective surface at an acute angle with respect to the focal plane of the sensor, with its axis substantially aligned with the sensor axis. Rotation of the mirror is accomplished by means of a scan motor 24. As the mirror rotates, a differential image acquired from the scan path 10 on the earth's surface is instantaneously reflected into the sensor. With the spacecraft velocity vector and the spin of the rotating mirror oriented as shown in FIG. 1, scanning of the earth's surface will be accomplished along the scan line 20 in the orientation shown. Ordinarily, the width of the path scanned is rather small. Suitable electronics (not shown) cause the sensor to operate only within a particular portion of each circular rotation of the mirror. Thus, the scan lines, as shown, comprise short, substantially circular arcs spaced from each other according to the relationship of the spacecraft velocity, the height of the spacecraft above the earth's surface and the rotational velocity of the mirror.

An inertial platform 28 is mounted within the spacecraft 5 in suitable relationship to the sensor 26 so that perturbations in the nominal attitude of the spacecraft can be detected. It should be noted that the nominal attitude may be permanently fixed, or it may be altered as desired, it being merely the "correct" attitude at any given time.

Although the inertial platform is well known in the art (as is the method of conical scan detction hereinabove described) it will be briefly described.

As shown schematically in FIG. 3, the inertial platform 28 comprises a pair of gyroscopes 70, 72, with their angular momentum vectors aligned perpendicularly along a pair of arbitrarily defined mutually orthogonal axes, $x$ and $y$. Taking gyroscope 70 as an example, since its momentum vector will remain aligned in space (until purposely changed) if the spacecraft attitude changes, the gyroscope housing (substantially fixed with respect to the spacecraft), will rotate with respect to the gyroscope momentum vector. Specifically, if the $z$ axis is aligned vertically (i.e., toward the earth), gyroscope 70 will detect pitch and yaw motion of the spacecraft, and gyroscope 72 will detect roll and yaw motion.

The specific angles of roll, pitch and yaw deviation can be detected by a number of rather conventional means, for example, by use of a resolver or by placing circular potentiometers in alignment with the circumference of each of the uniaxial gyroscope mounts. One tap of each such potentiometer would be a fixed point on the particular housing, while the other would be one of the gimbal points of the gyroscope, the housing point being selected so that it is aligned with the axis of the gyroscope when the spacecraft is in its nominal attitude (i.e., no angular deviation about the particular axis is being measured). Thus, when the attitude with respect to that particular axis changes by any given angle, the alignment of the two taps will be changed by the same angle, and the resultant voltage drop across the potentiometer will indicate this angle. Accordingly, at a given time there will be two voltage readings (one corresponding to each of the two axes about which angular deviation can be detected) from each of the two gyroscopes 70, 72. One of these four signals will, of course, be redundant, since any attitude can be described in terms of 3° of freedom measured with respect to three mutually orthogonal axes.

Thus, the data generated by the inertial platform consists of three signals, each representing an instantaneous angular deviation from nominal attitude about one of three mutually orthogonal axes — typically the roll, pitch and yaw axes. Such data can, of course, be generated by other attitude determination means, such as star trackers or horizon sensors.

The scan synchronization signal is also generated simultaneously with the data signal and the attitude signals. This signal merely corresponds to the instantaneous angle with respect to an arbitrarily defined null point of the rotating mirror 22 (i.e., of the shaft of the scan motor 24). In many cases, this signal is not necessary, since the scan sequence will be known and can be reproduced on the ground with only an (easily eliminated) initial point (i.e., synchronization) error.

The data signal, the synchronization signal and the three attitude perturbation signals are directed to the signal processor and transmitter 30, which is a conventional electronic package adapted to suitably process the signals and transmit them to a ground station. As is well known in the art, the signals will ordinarily be digitized and transmitted either in separate RF bands or multiplexed in some convenient manner.

The foregoing steps of the method and elements of the apparatus are reasonably well known to those familiar with the field of remote sensing by spacecraft. It is at this point, however, that the method and apparatus of the present invention completely depart from those heretofore utilized.

In the heretofore applied methods of image stabilization, the attitude perturbation data and sensor image data are placed into mathematical matrices and, by suitable matrix multiplication, the sensor image data are adjusted into "stabilized" values for subsequent projection onto a cathode ray tube screen or printout, photographic or otherwise.

Not so with the method and apparatus of the present invention. Here, rather than employ a digital method, analog methods are employed in reconstituting the stabilized image. This permits image reproduction in real time since, as will be seen shortly, the image stabilization and reproduction apparatus utilized in the present method and apparatus can respond to the five signals received from the spacecraft virtually instantaneously.

Figure 2:
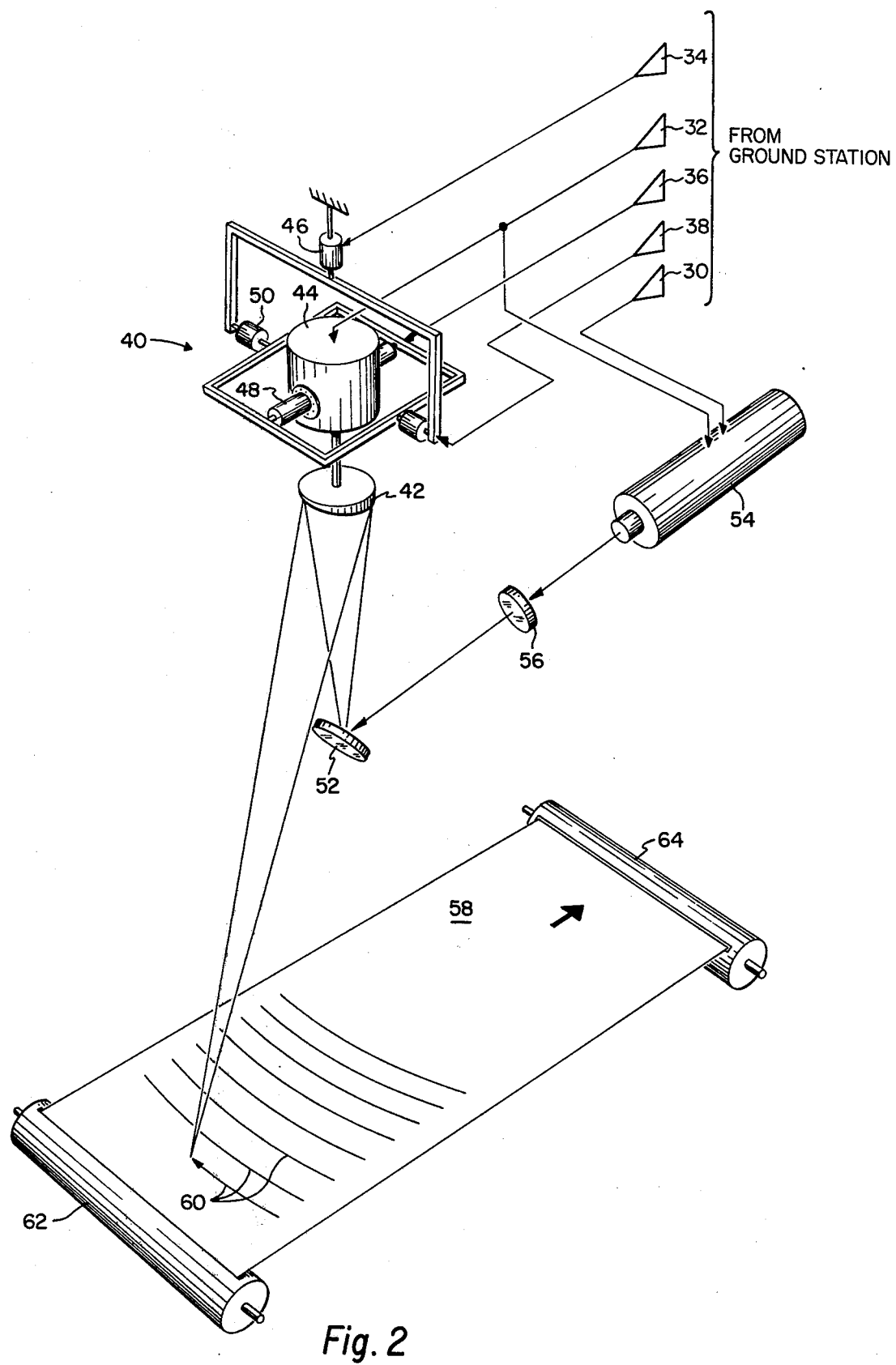
FIG. 2 is a schematic representation of an apparatus for reproduction of the image from the data acquired by the apparatus shown in FIG. 1.

Accordingly, with reference to FIG. 2, the video signal 30, synchronization signal 32, yaw signal 34, roll signal 36 and pitch signal 38 (the latter three, of course, indicating merely deviations from the nominal mode) are suitably amplified. These five signals will operate a reproduction scanner 40 and a light pencil generator, for example, a laser 54.

The reproduction scanner 40 virtually duplicates the acquisition scanner in the spacecraft 5. Accordingly, the rotating reproduction mirror 42 exactly duplicates the acquisition mirror 22, and the reproduction scan motor 44 reproduces the acquisition scan motor 24, with the orientation of rotation of the reproduction system identical to that of the acquisition system as shown. The laser 54 (or other source of a suitable light pencil), by projecting a beam of light through its associated optics 56 to the reflection mirror 52, to the rotating mirror 42 and then onto the photographic film 58, exactly reproduces the image acquisition system.

The nominal attitude of the reproduction scanner 40 with respect to the surface of the film 58, is the same as that of the spacecraft 5 with respect to the earth 15. Likewise, perturbation of the spacecraft is reproduced in the reproduction scanner by means of triaxial gimballing. Accordingly, the amplified yaw signal activates the yaw gimbal motor 46, the amplified roll signal activates the roll gimbal motor 48, while the amplified pitch signal activates the pitch gimbal motor 50. Thus, the attitude perturbation of the spacecraft is exactly reproduced in the reproduction scanner.

Similarly, the attitude perturbation may be reproduced by use of a stationary reproduction scanner and a gimballed secondary mirror. The gimballed secondary mirror can be oriented, with respect to the other elements of the system, either 1) to reflect the beam into the rotating mirror 42, from which it is reflected onto the surface 58, or 2) to accept the reflected beam from the rotating mirror and reflect it onto the surface. The exact construction of said working system need not be shown pictorially, as it will be obvious to those skilled in the pertinent art who study FIG. 2 of the drawing and the related textual material herein.

It might at first be thought that image stabilization will occur when the adjustment motion of the reproduction scanner 40, with respect to a particular axis, is the opposite of the corresponding perturbation motion of the spacecraft 5. Reference to FIGS. 4A and 4B will show that this is not the case, but rather that perturbation of the reproduction scanner should exactly reproduce the perturbation of the acquisition scanner (i.e., the spacecraft).

In FIG. 4A the solidly outlined region represents a region 80 of the earth surface to be scanned. In the center of this region is a point 82 from which light would be received by the satellite sensor 26 at a given instant of time if the satellite attitude were nominal. However, in our example, the perturbed attitude is such that the region which would actually be scanned is the region 81, shifted to the left and above the nominal region 80. The inertial platform 20 would, of course, record this attitude deviation properly as a roll to the left and a pitch upward of the spacecraft.

Referring to FIG. 4A, it will be noted that this perturbation of attitude places the spot 82 down and to the right in the frame which will actually be scanned by the space-craft sensor. I.e., the spot which should be observed halfway through the scan of the frame will actually be observed before the center of a scan, which is made less than halfway through the sequence of scans in that particular frame. Thus, when the image is reconstituted on the ground as shown in FIG. 4B, failure to stabilize the image would place the dot 82' (corresponding to the spot 82 on the earth's surface) low and to the right in the reproduced frame. However, in order to correctly reproduce the image of the earth's surface, the dot would have to be moved to the left and upward. But this correction movement exactly corresponds to the attitude perturbation of the spacecraft which resulted in the original unstable image.

Therefore, it can be seen that, in order to stabilize the image on the photographic film 58, the reproduction scanner must be perturbed in attitude exactly as the spacecraft attitude is perturbed.

The film 58 on which the resultant light beam from the laser 54 impinges, is mounted on a dispenser roller 62 which rolls in the direction shown in FIG. 2 toward the accumulation roller 64. The speed at which the film passes a particular point must be adjusted with the scan rate of the rotating mirror 42 so that when the mirror rotates, and thus causes the beam from the laser 54 to scan the film creating the scan lines 60, these scan lines will be spaced correctly to correspond to the earth scan made by the spacecraft 5. This simply requires that the film speed satisfy the relationship:

$$\omega_2 (V1/H1) = \omega_1 (VS/H2)$$

where

V1 is the spacecraft speed;

H1 is the height of the spacecraft above the surface scanned;

V2 is the speed of the film past a given point;

H2 is the height of the reflective surface of the rotating reproduction mirror 42 above the surface of the film 58;

$\omega_1$ is the angular velocity of the rotating acquisition mirror 22; and $\omega_2$ is the angular velocity of the rotating reproduction mirror 42.

The result is, upon development of the photographic film, a stabilized photograph of the portion of the earth's surface scanned.

The invention may be modified to satisfy a great number of image stabilization requirements. It will be seen that all such modifications are well within the capability of one reasonably proficient in the pertinent field.

For example, rather than conduct a conical scan, the scan could be made in a "line" (back-and-forth) manner. This simply requires that rather than placing the axis of rotation of the acquisition mirror 22 vertically with respect to the ground, it can be placed horizontally (in the direction of the spacecraft velocity) as shown in FIG. 5. Here, a number of acquisition scanning mirrors 22' are mounted on the circumference of a wheel 23', which is rotated by means of scan motor 24'. The axis of rotation, as previously stated, being aligned with the direction of velocity of the spacecraft. As in the preferred embodiment, light from the object is reflected into the sensor 26', deviations in the spacecraft attitude being detected by the inertial platform 28'. The method and apparatus for reproduction of the image is exactly similar to that in the preferred embodiment except, of course, that the reproductions scanning mirror and motor are arranged so that the axis of rotation is aligned in the direction of film motion, and reproduction mirrors are circumferentially mounted, as in the acquisition situation.

In other embodiments it might be desirable to tape record the output from the spacecraft for later reproduction, rather than reproducing the image in real time. Here, it would simply be a matter of recording the output on a five-channel tape recorder for simultaneous playback.

Furthermore, it might be desirable, rather than producing a hard copy photograph of the image, to project the image onto the screen of a cathode ray tube. This may be done in a conventional manner by projecting an electron beam from an electron gun onto a phosphorescent screen and deflecting the beam by use of electrostatic deflector plates or magnetic coils. The instantaneous amplitude of the electron beam represents the data signal, while the synchronization of the horizontal and vertical scans represents the synchronization of the image acquisition scan (here, most probably a line scan).

In the cathode ray tube situation, stabilization accomplished by perturbing the electron beam deflection scan by means of the attitude perturbation signals from the inertial platform. Since the cathode ray tube scan is essentially 2-dimensional, an intermediate step may be required, that of converting the three-axis perturbation data into two-axis (horizontal and vertical) perturbation. This step can be readily accomplished by means of conventional logic circuitry imposed between the three attitude perturbation signal amplifiers and the two deflector plates or coils.

In any event, stabilization is accomplished merely by summing a perturbation signal with each deflector (i.e., scan) signal.

The stabilized television picture can be telecast to ordinary television receivers in real time with conventional broadcast equipment by projecting the stabilized image onto the screen of the cathode ray tube and detecting this image with a second television camera. A state-of-the-art scan converter would accomplish this purpose. If delayed rebroadcasting is desired, a video taperecorder could be used in place of the second television camera.

Like the hard copy photograph case of the preferred embodiment, hereinabove described in detail, image stabilization in the cathode ray tube case requires that the orientation of the perturbation in the beam deflection be identical to the orientation of the satellite perturbation. Since a cathode ray tube is, in a sense, back lit, the point of reference from which the electron beam deflection is observed would be from behind the screen, i.e., viewing the screen from the inside of the tube. It is clear that this is the case since, from this point of reference, viewing the screen of the cathode ray tube corresponds to, in the preferred embodiment of this invention, viewing the photographic film from above.

The method and apparatus of the present invention need not be restricted to embodiments in the satellite detection field. For example, this invention will find application in image stabilization of television images acquired by remote cameraman having TV cameras mounted on their shoulders, in helicopters or in aircraft, particularly in the case where, because of the distance between camera and subject, a telephoto lens is used. The principle is identical to that underlying the principal embodiment of the invention, and indeed, the implementation is almost identical. The camera possesses an inertial platform which is instantaneously aligned according to the instantaneous nominal camera attitude desired. The attitude perturbation is then transmitted or recorded (for example, on tape channels separate from a video recording), along with a video recording (the image data) and the TV camera horizontal and vertical scan synchronization data. The image is stabilized upon reproduction in exactly the same manner as in the case of the preferred embodiment of the present invention.

In certain cases, it is possible to effect image stabilization by suitably altering the scan synchronization of the image reproduction system, rather than by perturbing a beam deflection device, mechanically or otherwise.

For example, in the TV camera/CRT system described above, it is noted that (with the usual small-angle approximations) camera pitch can be simulated by suitably advancing or retarding the vertical sweep (scan) synchronization. Likewise, camera yaw can be simulated by suitably advancing or retarding the horizontal sweep (scan) synchronization. Thus, by employing the pitch and yaw attitude deviation signals from the inertial platform, using conventional logic circuitry, the sweep synchronization signals can be suitably altered, at the image acquisition stage, to create a pitch-and-yaw-attitude stabilized image at the reproduction stage without the necessity of separate perturbation beam deflection.

It would also be within the skill of the ordinary practitioner to resolve roll attitude perturbation along the pitch and yaw axes and sum the effect thereof with the scan synchronization signals, as in the above case, thereby achieving three-axis stabilization without the use of perturbation beam deflection.

I claim:

1. The method of stabilizing, during reproduction, the image of a scene acquired as an electronic signal by a scanning electromagnetic energy sensor contained within a structure, comprising the steps of:
   a. Acquiring, substantially simultaneously with the acquisition of the sensor signal, an electronic data sequence representing the instantaneous deviation, from the nominal, of the attitude of the structure, relative to the scene, said data sequence comprising three substantially simultaneous electronic signals, each representing said deviation with respect to a single one of three mutually orthogonal axes; and
   b. Generating a reproduction image of the sensor by deflecting, in accordance with the scan cycle of the sensor, an image-generating beam whose instantaneous relative amplitude corresponds to the amplitude of the sensor signal, and pertrubing said deflection, substantially simultaneously, in accordance with said data sequence.

2. The method as recited in claim 1, wherein said steps of acquiring and generating are performed in real time.

3. The method as recited in claim 1, wherein the sensor comprises an infrared detector.

4. The method as recited in claim 1, wherein the sensor comprises a television camera pickup tube.

5. The method as recited in claim 1, wherein the sensor comprises a microwave detector.

6. The method as recited in claim 1, wherein the sensor comprises a visible light detector.

7. The method as recited in claim 1, wherein said steps of acquiring and generating are not performed in real time.

8. The method as recited in claim 7, further including the intermediate step of recording the sensor signal and said data sequence on magnetic tape.

9. The method as recited in claim 1, wherein said step of generating comprises exposure of a light-sensitive surface by a beam of light.

10. The method as recited in claim 9, wherein said beam is produced by a laser device.

11. The method as recited in claim 9, wherein said deflection is accomplished by primary optical means whose orientation is controlled by mechanical means.

12. The method as recited in claim 11, wherein said perturbation is accomplished by secondary mechanical manipulation of said mechanical means.

13. The method as recited in claim 11, wherein said perturbation is accomplished by secondary optical means oriented with respect to said primary optical means and said surface so as to cause the beam to travel from said primary optical means to said secondary optical means and onto said surface, the instantaneous orientation of said secondary optical means being controlled by mechanical means responsive to said data sequence.

14. The method as recited in claim 11, wherein said perturbation is accomplished by secondary optical means oriented with respect to said primary optical means and said surface so as to cause the beam to travel from said secondary optical means to said primary optical means and onto said surface, the instantaneous orientation of said secondary optical means being controlled by mechanical means responsive to said data sequence.

15. The method as recited in claim 11, wherein
the structure containing the sensor is in motion relative to the scene, and
relative motion is provided between said light-sensitive surface and said optical deflection means, corresponding to the relationship:

$$(\omega_2 V_1/H_1) = (\omega_1 V_2/H_2),$$

where
$V_1$ is the speed of the sensor relative to the scene;
$H_1$ is the distance from the sensor to the scene;
$V_2$ is the relative speed of the surface with respect to said primary optical deflector means; and
$H_2$ is the length of said beam from said optical deflector means to said surface,
$\omega_1$ is the angular velocity of the sensor scan
$\omega_2$ is the angular velocity of the primary optical deflector 16. The apparatus for stabilizing, during reproduction, the image of a scene acquired as an electronic signal by a scanning electromagnetic energy sensor contained within a structure, comprising:
a. Means for acquiring, substantially simultaneously with the acquisition of the sensor signal, an electronic data sequence representing the instantaneous deviation, from the nominal, of the attitude of the structure relative to the scene, said data sequence comprising three substantially simultaneous electronic signals, each representing said deviation with respect to a single one of three mutually orthogonal axes; and
b. Means for generating a reproduction image of the scene including means for deflecting, in accordance with the scan cycle of the sensor, an image-generating beam whose instantaneous relative amplitude corresponds to the amplitude of the sensor signal, and means for perturbing said deflection, substantially simultaneously, in accordance with said data sequence.

17. The apparatus as recited in claim 16, wherein said means for acquiring and generating are operable in real time.

18. The apparatus as recited in claim 16, wherein said sensor comprises an infrared detector.

19. The apparatus as recited in cliam 16, wherein said sensor comprises a television camera pickup tube.

20. The apparatus as recited in claim 16, wherein said sensor comprises a microwave detector.

21. The apparatus as recited in claim 16, wherein said sensor comprises a visible light detector.

22. The apparatus as recited in claim 16, wherein said means for acquiring and generating are not operable in real time.

23. The apparatus as recited in claim 22, further including the means for recording the sensor signal and said data sequence on magnetic tape and means for retrieving it therefrom, said generating means being operably associated with said retrieval means.

24. The apparatus as recited in claim 16, wherein said means for generating comprises a light-sensitive surface, means to produce a beam of light and means to direct said light beam to said surface so as to selectively expose said surface.

25. The apparatus as recited in claim 24, wherein said beam production means comprises a laser device.

26. The apparatus as recited in claim 24, wherein said deflection means comprises primary optical means whose orientation is controlled by mechanical means.

27. The apparatus as recited in claim 26, wherein said perturbation means comprises means for secondary mechanical manipulation of said mechanical means.

28. The apparatus as recited in claim 26, wherein said perturbation means comprises secondary optical means oriented with respect to said primary optical means and said surface so as to cause said beam to travel from said primary optical means to said secondary optical means and onto said surface, the instantaneous orientation of said secondary optical means being controlled by mechanical means responsive to said data sequence.

29. The apparatus as recited in claim 26, wherein said perturbation is accomplished by secondary optical means oriented with respect to said primary optical means and said surface so as to cause the beam to travel from said secondary optical means to said primary optical means and onto said surface, the instantaneous orientation of said secondary optical means being controlled by mechanical means responsive to said data sequence.

30. The apparatus as recited in claim 26, wherein
the structure containing the sensor is in motion relative to the scene, and further including means to provide relative motion between said light-sensitive surface and said optical deflection means, corresponding to the relationship:

$$\omega_2 (V_1/H_1) = \omega_1 (V_2/H_2,$$

where
$V_1$ is the speed of the sensor relative to the scene;
$H_1$ is the distance from the sensor to the scene;
$V_2$ is the relative speed of the surface with respect to said optical deflector means; and
$H_2$ is the length of said beam from said primary optical deflector means to said surface,
$\omega_1$ is the angular velocity of the sensor scan
$\omega_2$ is the angular velocity of the primary optical deflector.

* * * * *